(12) United States Patent  
Barnett et al.

(10) Patent No.: US 9,003,811 B2
(45) Date of Patent: Apr. 14, 2015

(54) SUPPORT FOR ELECTRIC MACHINE IN A TURBINE ENGINE

(75) Inventors: Barry Barnett, Markham (CA); David Denis, Burlington (CA)

(73) Assignee: Pratt & Whitney Canada Corp., Longueuil (CA)

( * ) Notice: Subject to any disclaimer, the term of this patent is extended or adjusted under 35 U.S.C. 154(b) by 712 days.

(21) Appl. No.: 13/304,960

(22) Filed: Nov. 28, 2011

(65) Prior Publication Data

US 2013/0133336 A1 May 30, 2013

(51) Int. Cl.
*F02C 7/20* (2006.01)
*F16M 13/00* (2006.01)
*F01D 15/10* (2006.01)
*F01D 25/04* (2006.01)
*F01D 25/16* (2006.01)
*F02C 7/32* (2006.01)

(52) U.S. Cl.
CPC .............. *F01D 25/164* (2013.01); *F01D 15/10* (2013.01); *F01D 25/04* (2013.01); *F02C 7/32* (2013.01); *Y02T 50/671* (2013.01); *Y10T 29/49009* (2013.01)

(58) Field of Classification Search
USPC ............ 60/796–800, 802; 248/671, 554, 555, 248/556, 557
See application file for complete search history.

(56) References Cited

U.S. PATENT DOCUMENTS

| | | | |
|---|---|---|---|
| 2,561,994 A | 7/1951 | Rashevsky et al. | |
| 2,754,441 A | 7/1956 | Morgan | |
| 4,012,654 A | 3/1977 | Starcevic | |
| 4,060,744 A | 11/1977 | Starcevic | |
| 4,230,960 A | 10/1980 | Mayher et al. | |
| 4,249,097 A | 2/1981 | Gronholm | |
| 4,250,423 A | 2/1981 | Linscott, Jr. | |
| 4,341,968 A | 7/1982 | Borden et al. | |
| 4,425,523 A | 1/1984 | Detinko et al. | |
| 4,663,553 A | 5/1987 | Zimmermann | |
| 5,117,140 A | 5/1992 | Sargeant et al. | |
| 5,397,954 A | 3/1995 | Besson | |
| 5,867,979 A | 2/1999 | Newton et al. | |
| 6,091,177 A | 7/2000 | Carbonell et al. | |
| 6,144,129 A | 11/2000 | Fuller et al. | |
| 6,581,874 B2 * | 6/2003 | Lemire et al. | 244/54 |
| 6,825,640 B1 | 11/2004 | Hill et al. | |
| 7,045,918 B2 | 5/2006 | Jonson | |
| 7,550,881 B1 | 6/2009 | Dietrich et al. | |
| 7,728,447 B2 * | 6/2010 | Becquerelle et al. | 290/3 |
| 7,841,163 B2 | 11/2010 | Welch et al. | |
| 8,278,774 B2 * | 10/2012 | Macchia | 290/52 |
| 2008/0238098 A1 * | 10/2008 | Becquerelle et al. | 290/3 |

* cited by examiner

*Primary Examiner* — Gerald L Sung (74) *Attorney, Agent, or Firm* — Norton Rose Fulbright Canada LLP (57) ABSTRACT

Devices and methods for supporting an accessory (32) in a gas turbine engine (10) are disclosed. The accessory (32) may have an interface (36) for coupling to a shaft (24) of the gas turbine engine (10). The device may comprise a first support (38) configured to support a first portion (34) of the accessory (32) proximal the interface (36) and a second support (40) configured to support a second portion (35) of the accessory (32) distal from the interface (36). The second support (40) may be configured to provide a lower resistance to relative displacement between the accessory (32) and structure (42) of the engine (10) than does the first support (34).

17 Claims, 6 Drawing Sheets

SUPPORT FOR ELECTRIC MACHINE IN A TURBINE ENGINE

TECHNICAL FIELD

The disclosure relates generally to gas turbine engines, and more particularly to supporting an electric machine in a gas turbine engine.

BACKGROUND

During operation of a gas turbine engine, hot combustion gases cause certain areas and components of the engine to reach relatively high temperatures and consequently undergo significant amounts of thermal expansion. Since various components, even within specific areas of the engine, may reach different temperatures and may be made from different materials, such components may expand at different rates and by different amounts during operation of the engine. The significant amounts and mismatch of thermal expansion experienced by the components in these areas can cause serious challenges in accurately and reliably supporting accessories in such areas and can hinder the mounting of certain accessories in such areas.

Improvement in supporting engine accessories in gas turbine engines is therefore desirable.

SUMMARY

There is provided, in accordance with one aspect of the present disclosure, a device for supporting an electric machine in a gas turbine engine wherein the electric machine includes an interface for coupling to a shaft of the gas turbine engine. The device comprises: a first support configured to secure the electric machine to a structure of the engine, the first support being configured to support a first portion of the machine proximal to the interface and substantially maintain positioning of the interface relative to the shaft; and a second support configured to secure the electric machine to the structure of the engine, the second support being configured to support a second portion of the machine distal from the interface and to provide a lower resistance to relative displacement between the electric machine and the structure of the engine than does the first support.

There is also provided a gas turbine engine comprising: a high pressure spool and a cooperating low pressure spool; an accessory mounted substantially coaxially with the low pressure spool, the accessory having an interface for coupling with the low pressure spool; a first support securing the accessory to a structure of the engine, the first support supporting a first portion of the accessory proximal to the interface and substantially maintaining alignment between the interface and the low pressure spool; and a second support securing the accessory to the structure of the engine, the second support supporting a second portion of the accessory distal from the interface, the second support providing a lower resistance to relative displacement between the electric machine and the structure of the engine than does the first support.

There is further provided a method for supporting an electric machine in a gas turbine engine, wherein the electric machine has an interface for coupling to a shaft of a gas turbine engine. The method comprises: supporting a first portion of the electric machine proximal to the interface to substantially maintain positioning of the interface relative to the shaft; supporting a second portion of the electric machine distal from the interface; and providing a lower resistance to relative displacement between the second portion of the electric machine and the structure of the engine than between the first portion of the electric machine and the structure of the engine.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Various aspects of embodiments are described through reference to the drawings.

Figure 1:
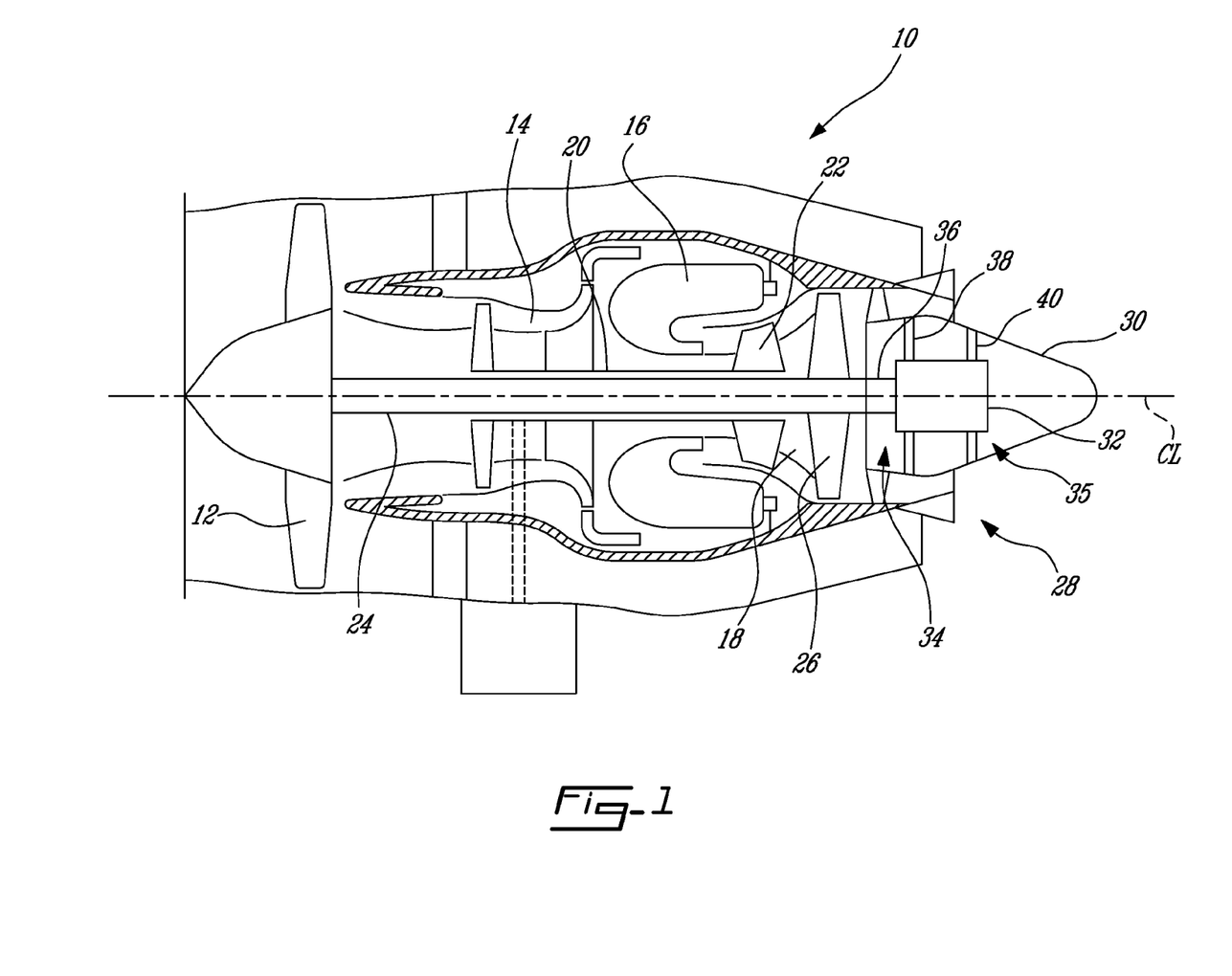
FIG. 1 shows an axial cross-section view of a turbo-fan gas turbine engine.

FIG. 1 illustrates an exemplary gas turbine engine 10 preferably provided for use in subsonic flight, generally comprising in serial flow communication fan 12 through which ambient air is propelled, multistage compressor 14 for pressurizing the air, combustor 16 in which the compressed air is mixed with fuel and ignited for generating an annular stream of hot combustion gases, and turbine section 18 for extracting energy from the combustion gases.

Turbine engine 10 may comprise one or more high pressure spools and one or more cooperating low pressure spools. For example, high pressure spool(s) may comprise high pressure shaft(s) 20 to which compressor 14 and one or more high pressure turbines 22 may be coupled. Low pressure spool(s) may comprise low pressure shaft(s) 24 to which fan(s) 12 and low pressure turbine(s) 26 may be coupled. High pressure shaft(s) 20 and low pressure shaft(s) 24 may be substantially coaxial and positioned along axial center line CL of engine 10 shown in FIG. 1. Low pressure shaft(s) 24 may be disposed inside high pressure shaft(s) 20. Engine 10 may comprise a tail portion, generally shown at 28, which may include tail cone 30 disposed downstream from low pressure turbine(s) 26.

Tail cone 30 may house one or more accessories of engine 10 such as, for example, electric machine(s) 32. Electric machine(s) 32 may operate as an electric generator and/or electric motor. Electric machine(s) 32 may be oil cooled. Electric machine(s) 32 may have forward portion(s), generally shown at 34, including an interface for coupling to low pressure shaft(s) 24 of engine 10. Interface may include an input and/or output shaft(s) 36. Input/output shaft(s) 36 may be used to transmit energy from electric machine(s) 32 to low pressure shaft(s) 24 when electric machine(s) 32 is/are used as electric motor(s) and input/output shaft(s) 36 may be used to transmit energy from low pressure shaft(s) 24 to electric machine(s) 32 when electric machine(s) 32 is/are used as electric generator(s). Accordingly, electric machine(s) 32 may be used to generate electricity for powering various systems and/or devices associated with engine 10 and/or an aircraft (not shown) to which engine 10 may be mounted.

Figure 2:
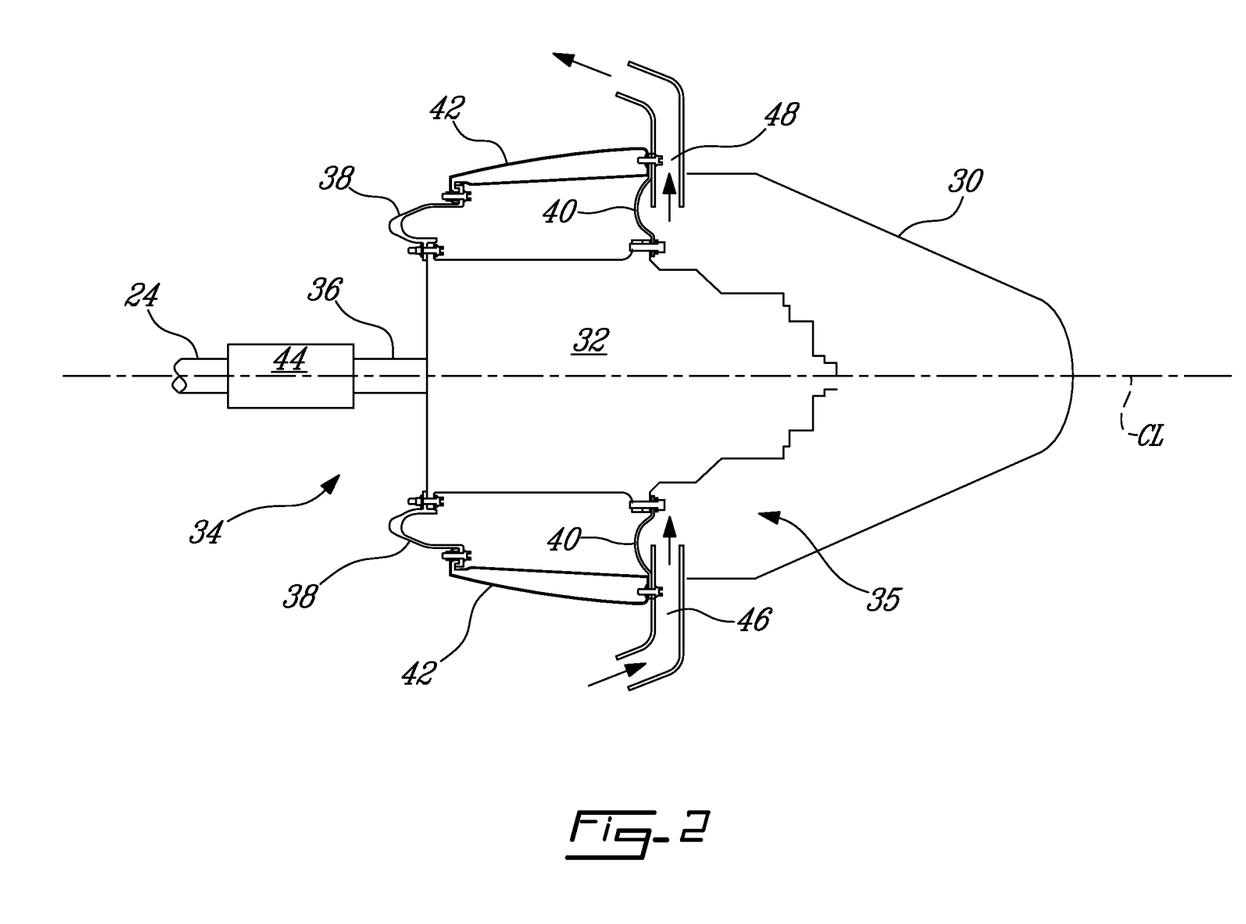
FIG. 2 shows an axial cross-section view of an electric machine mounted in a tail portion of the gas turbine engine of FIG. 1.

Electric machine(s) 32 may be supported by a device comprising first support(s) 38 and second support(s) 40. Both first support(s) 38 and second support(s) 40 may be configured to support different regions or portions of electric machine(s) 32. For example, first support(s) 38 may be configured to support forward portion(s) 34 (e.g. proximal to input/output shaft(s) 36) of electric machine(s) 32 and second support(s) 40 may be configured to support one or more portions 35 of electric machine(s) 32 distal (e.g. axially downstream) from input/output shaft(s) 36.

FIG. 2 shows an exemplary representation of tail cone 30 of tail portion 28 of engine 10 where electric machine(s) 32 may be supported inside tail cone 30. Both first support(s) 38 and second support(s) 40 may be configured to secure electric machine(s) 32 to appropriate support structure(s) 42 of engine 10. Support structure(s) 42 may, for example, include or be directly or indirectly attached to a turbine exhaust case of engine 10 to which tail cone 30 may also be secured. Structure(s) 42 may include one or multiple components. First support(s) 38 and second support(s) 40 may be configured to support electric machine(s) 32 so that input/output shaft(s) 36 may be substantially coaxial with low pressure shaft(s) 24 of engine 10. Accordingly, electric machine(s) 32 may also be positioned so that a center line of input/output shaft(s) 36 may be in substantial alignment with axial center line CL of engine 10.

Coupling mechanism(s) 44 may be used to transfer energy between low pressure shaft(s) 24 and input/output shaft(s) 36. Accordingly, coupling mechanism(s) 44 may be configured to transfer torque between low pressure shaft(s) 24 and input/output shaft(s) 36 and may comprise a spline coupling. Cooling fluid inlet 46 and cooling fluid outlet 48 may be provided to permit a cooling fluid such as air (see arrows in FIG. 2) to be circulated through and cool a space within tail cone 30. Electric machine(s) 32 may comprise a housing made of a material that is different than that of tail cone 30 and/or structure(s) 42. For example, electric machine(s) 32 may comprise a housing made at least in part of an aluminum-based alloy while tail cone 30 and structure(s) 42 may be made at least in part of a nickel-based alloy such as IN-718.

First support(s) 38 may have a first stiffness (k1) and second support(s) 40 may have a second stiffness (k2). The first stiffness(es) (k1) of first support(s) 38 may be greater than the second stiffness(es) (k2) of the second support(s) 40 (i.e. k1>k2). It will be apparent to those skilled in the relevant arts that the stiffness (k) may include a measure of resistance offered by an elastic body to deformation. For example, the stiffness (k) of a body may be represented as "k=F/δ" where F is a force applied to the body and δ is the displacement produced by the force F along the same direction (i.e. degree of freedom). For example, second support(s) 40 may have a lower resistance to relative axial displacement between electric machine(s) 32 and structure(s) 42 of engine 10 than first support(s) 38. Second support(s) 40 may also have a lower resistance to relative radial displacement between electric machine(s) 32 and structure(s) 42 of engine 10 than first support(s) 38.

Figure 3:
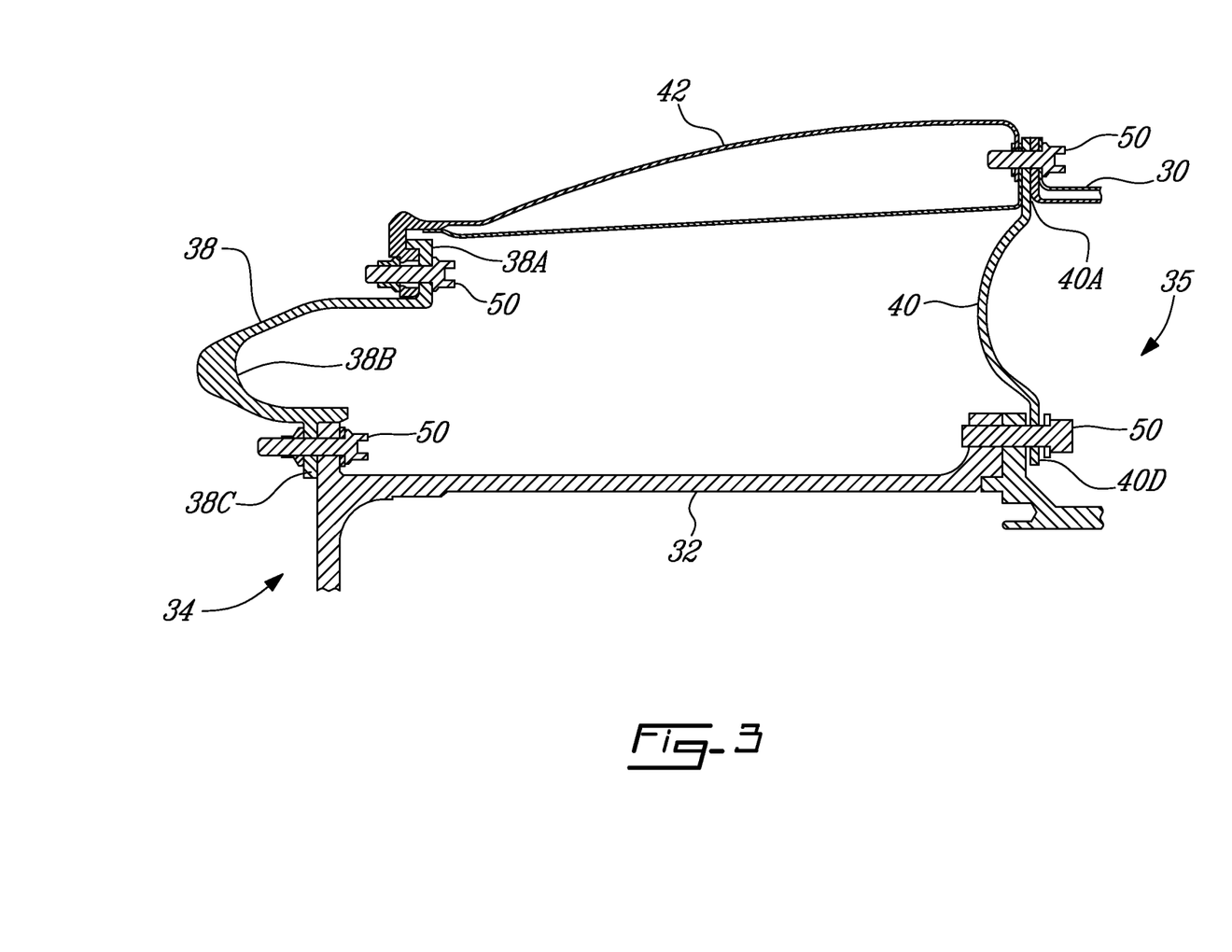
FIG. 3 shows an axial cross-section view of a first support and second support supporting the electric machine of FIG. 2.

FIG. 3 shows a larger scale representation of first support(s) 38 and second support(s) 40 supporting an upper region of electric machine(s) 32. First support(s) 38 may be secured to and support forward portion(s) 34 near input/output shaft(s) 36 of electric machine(s) 32 and to structure(s) 42 via fasteners 50. Second support(s) 40 may be secured to and support another portion of electric machine(s) 32 away from (i.e. distal) from input/output shaft(s) 36 and to structure(s) 42 via other fasteners 50. For example, second support(s) 40 may be configured to be secured to and support a substantially mid portion of electric machine(s) 32. Alternatively or in addition, second support(s) 40 could also be configured to be secured to and support a portion 35 of electric machine(s) 32 which is axially opposite to forward portion(s) 34 (e.g. an aft portion) of electric machine(s) 32. Accordingly, second support(s) 40 may be configured to be secured to electric machine(s) 32 at a distance from where first support(s) 38 may be secured to electric machine(s) 32.

Fasteners 50 may include any suitable conventional or other fastening means. For example, fasteners 50 may include threaded fasteners such as bolts. Fasteners 50 may not necessarily be all of the same type and may include a combination of different types and/or sizes of fastening means. As shown in FIG. 3, tail cone 30 may also be secured to structure(s) 42 via one or more fasteners 50 which is/are also used to secure second support(s) 40 to structure(s) 42. In addition to threaded fasteners, alignment pins (e.g. spigots) may be used between supports 38, 40 and structure(s) 42 and/or between supports 38, 40 and electric machine(s) 32 to achieve sufficiently accurate alignment (e.g. axial and/or radial) of electric machine(s) 32 relative to low pressure shaft(s) 24.

Figure 4A:
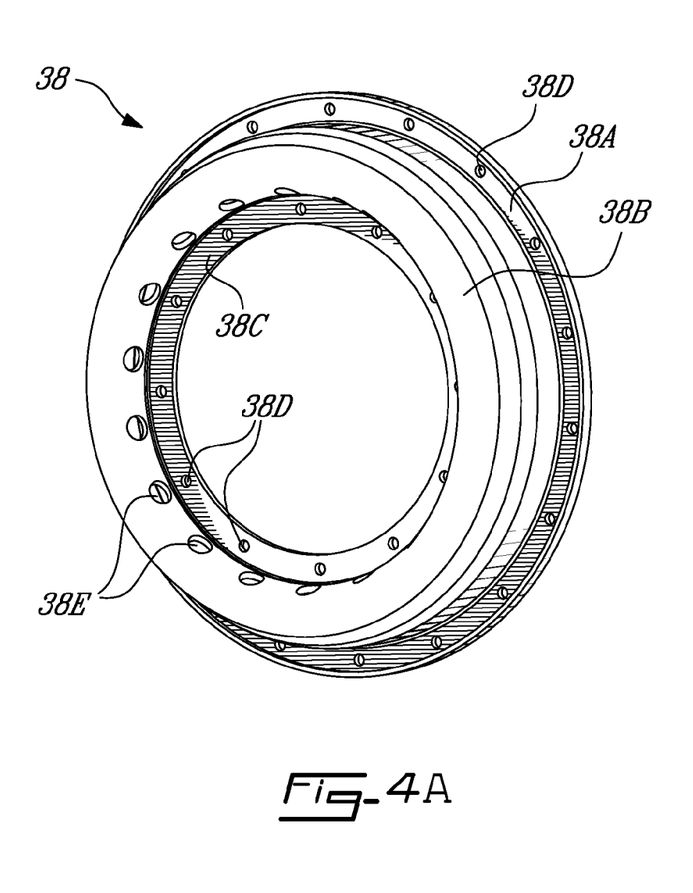
FIGS. 4A-4C respectively show a perspective view, front elevation view and cross-section view of the first support of FIG. 3.
Figure 4B:
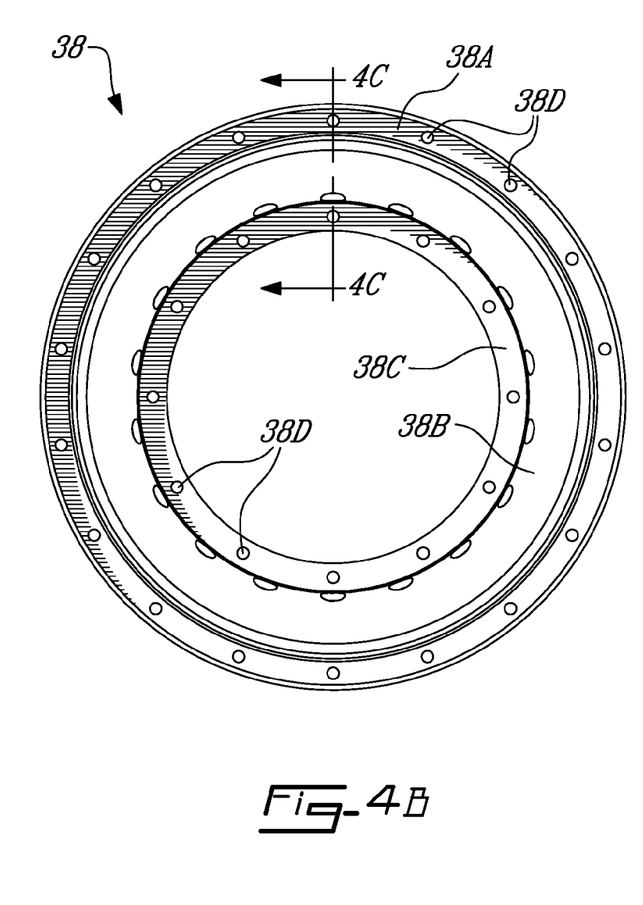
Figure 4C:
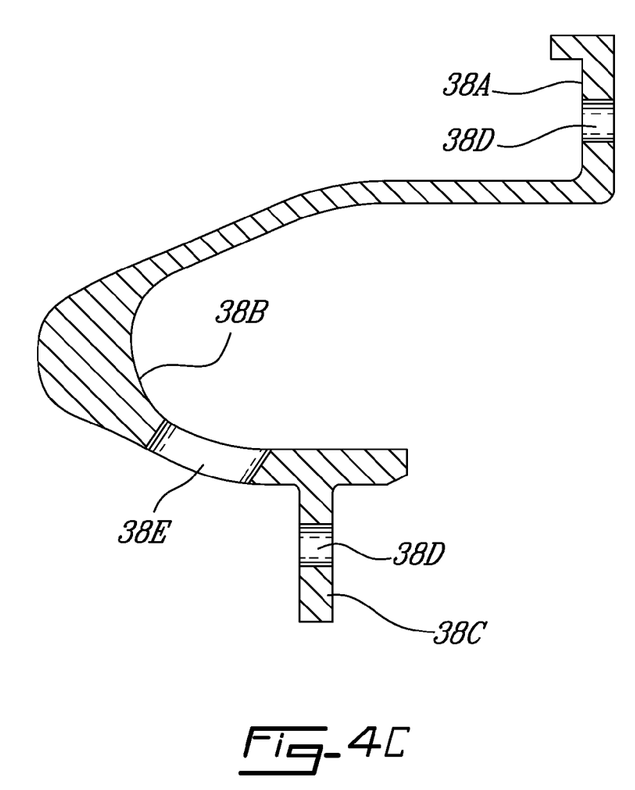

FIGS. 4A-4B respectively show a perspective view and front view of first support(s) 38. FIG. 4C shows a cross-sectional view of first support(s) 38 along line 4C-4C in FIG. 4B. As shown, first support(s) 38 may have a substantially annular configuration. First support(s) 38 may have radially outer flange(s) 38A configured for attachment to structure(s) 42 of engine 10, mid section(s) 38B and radially inner flange(s) 38C configured for attachment to electric machine(s) 32. Outer flange(s) 38A may comprise one or more holes 38D to accommodate fasteners 50 and/or alignment pins for securing first support(s) 38 to structure(s) 42. Similarly, inner flange(s) 38B may also comprise one or more holes 38D to accommodate fasteners 50 and/or alignment pins for securing first support(s) 38 to electric machine(s) 32. First support(s) 38 may also comprise one or more through passages 38E (e.g. ventilation holes) for permitting flow of cooling fluid inside tail cone 30 and/or the passage of service lines (e.g. cooling oil and electrical) to/from electric machine(s) 32. Hole(s) 38D in inner flange(s) 38C may be configured according to a corresponding one or more mounting holes provided on electric machine(s) 32. Hole(s) 38D in inner flange(s) 38C and outer flange(s) 38A may be circumferentially distributed about flanges 38A and 38C to provide support in multiple radial directions.

First support(s) 38 may have a substantially uniform or varying thickness and shape to achieve a desired stiffness. For example, first support(s) 38 may be configured to support a majority of the weight of electrical machine(s) 32 while also maintaining suitable alignment and/or positioning of input/output shaft(s) 36 relative to low pressure shaft(s) 24. First support(s) 38 may also be configured to damp vibrations during operation. Accordingly, first support(s) 38 may comprise a portion that is curved or at least partially folded. Mid section(s) 38B may be curved in the axial direction of electric machine(s) 32 and of engine 10 (see FIGS. 3 and 4C). For example, mid section(s) 38B may be substantially C-shaped. For example, mid section(s) 38B may include a region of increased wall thickness. In an exemplary embodiment where electric machine(s) 32 may have a weight of around 110 lbs (50 kg), first support(s) 38 configured as shown in FIGS. 4A-4C may be made from a nickel-based allow such as IN-718 and may have a nominal thickness that is greater than 0.1 in (2.5 mm) thick. One skilled in the relevant arts will appreciate that other materials, cross-sectional profiles and thicknesses may be suitable and may be used to obtain the desired stiffness for first support(s) 38. First support(s) 38 may, for example, be formed by forging, drilling and/or by other suitable manufacturing process(es).

Figure 5A:
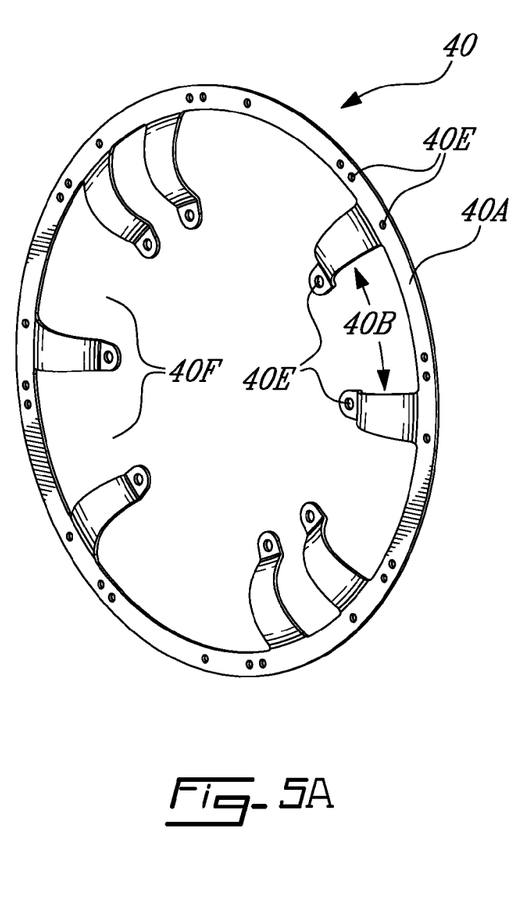
FIGS. 5A-5C respectively show a perspective view, front elevation view and cross-section view of the second support of FIG. 3.
Figure 5B:
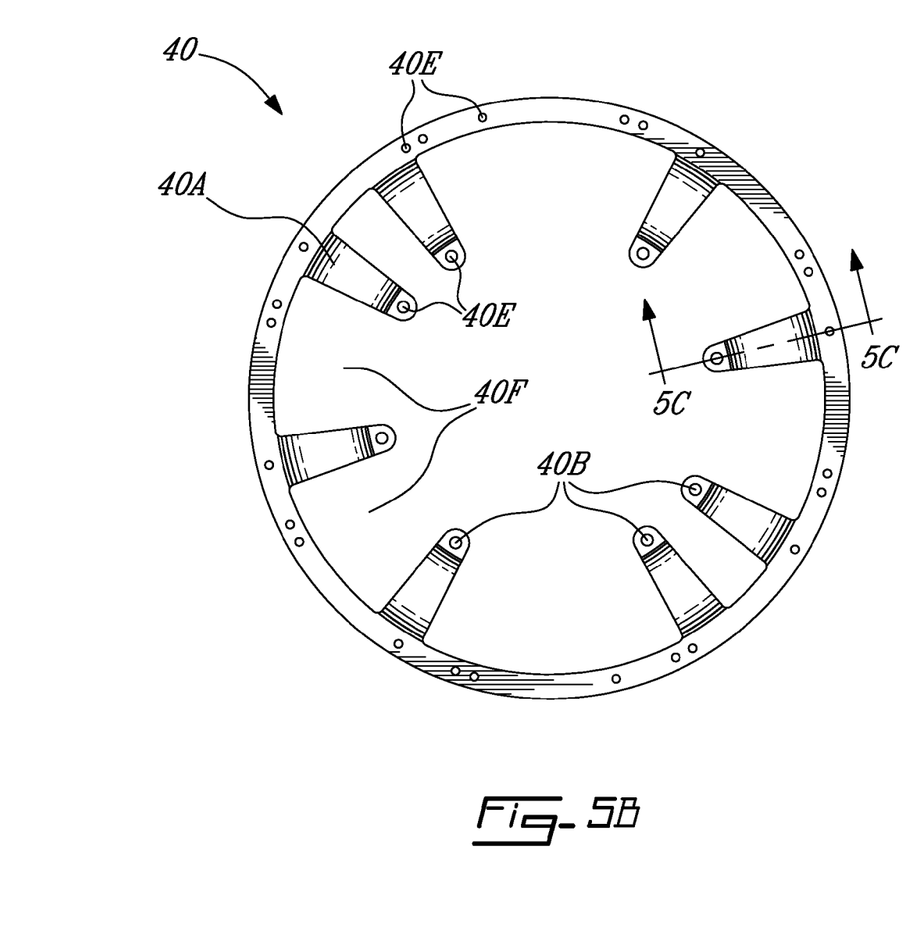
Figure 5C:
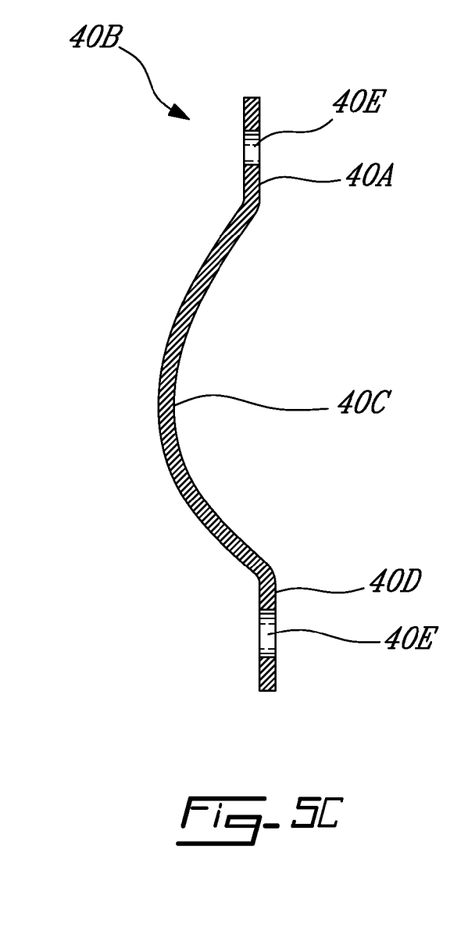

FIGS. 5A-5B respectively show a perspective view and front view of second support(s) 40. FIG. 5C shows a cross-sectional view of second support(s) 40 along line 5C-5C in FIG. 5B. Second support(s) 40 may have a lower stiffness than first support(s) 38. Accordingly, second support may have a lower resistance to relative axial and/or radial displacement between electric machine(s) 32 and structure(s) 42 of engine 10 than first support(s) 38. Second support(s) 40 may still provide sufficient radial support to maintain alignment between input/output shaft(s) 36 of electric machine(s) 32 and low pressure shaft(s) 24 and thereby prevent droop of electric machine(s) 32. Second support(s) 40 may also be configured to damp vibrations during operation.

As shown, second support(s) 40 may have a substantially annular configuration. Second support(s) 40 may have outer annular member(s) 40A configured for attachment to structure(s) 42 of engine 10 and one or more beams or fingers 40B extending substantially radially from annular member(s) 40A. Finger(s) 40B may be configured for attachment to electric machine(s) 32. Finger(s) 40B may each comprise mid section(s) 40C and mounting section(s) 40D. Annular member(s) 40A may be in the form of a flange and may comprise hole(s) 40E to accommodate fasteners 50 and/or alignment pins for securing second support(s) 40 to structure(s) 42. Similarly, mounting section(s) 40D may also comprise one or more holes 40E to accommodate fasteners 50 and/or alignment pins for securing second support(s) 40 to electric machine(s) 32. Finger(s) 40B may be separated by spaces 40F permitting flow of cooling fluid inside tail cone 30 and/or the passage of service lines (e.g. cooling oil, electrical) to/from electric machine(s) 32. Finger(s) 40B and hole(s) 40E in finger(s) 40B may be configured and provided according to a corresponding one or more mounting holes provided on electric machine(s) 32. For example, finger(s) 40B may be circumferentially distributed about annular member(s) 40A to provide support in multiple radial directions.

Finger(s) 40B may comprise a curved and/or an at least partially folded portion. For example, mid section(s) 40C may be curved in the axial direction of electric machine(s) 32 and of engine 10 (see FIGS. 3 and 5C). Mid section(s) 40C may be substantially C-shaped. Second support(s) 40 may also have a uniform or varying wall thickness. In the above exemplary embodiment where electric machine(s) 32 may have a weight of around 110 lbs (50 kg), second support(s) 40 may be configured as shown in FIGS. 5A-5C and may be made from a nickel-based allow such as IN-718 and may have a nominal thickness of around 0.09 in (2.3 mm) thick. One skilled in the relevant arts will appreciate that other materials, cross-sectional profiles and thicknesses may be suitable and may be used to obtain the desired stiffness for second support(s) 40. Second support(s) 40 may, for example, be formed by forging, drilling and/or by other suitable manufacturing process(es).

During operation, as turbine section(s) 18 of engine 10 extracts energy from the hot combustion gases, low pressure shaft(s) 24 of low pressure spool may drive electric machine(s) 32 via coupling mechanism(s) 44 so that electric machine(s) 32 may be operated as a generator. As the annular stream of hot combustion gases is exhausted of engine 10, various components of tail section 28 of engine 10 may be subjected to elevated temperatures and may undergo thermal expansion. For example, tail cone 30 may come in contact with the annular stream of combustion gases exiting engine 10. Accordingly, at least some portions of tail cone 30 and/or structure(s) 42 may reach temperatures of around 1200° F. (650° C.) while electric machine(s) 32 maybe maintained at cooler temperatures of around 400° F. (200° C.) by the cooling fluid inside tail cone 30. Accordingly, there may be relatively large temperature differences between components to which first support(s) 38 and second support(s) 40 are secured and hence large differences in amounts thermal expansion of those components. The thermal expansion mismatch may be further amplified due to the fact that, as described above, tail cone 30, structure(s) 42 and electric machine(s) 32 may be made from different materials potentially having different thermal expansion coefficients.

First support(s) 38 and second support(s) 40 may be configured to support electric machine(s) 32 in substantial alignment with low pressure shaft(s) 24 while at least partially limiting and/or preventing the creation of excessive stresses in first support(s) 38, second support(s) 40, structure(s) 42 and/or electric machine(s) 32 during operation due to the differences in thermal expansion between electric machine(s) 32 and structure(s) 42. Accordingly, forward portion(s) 34 of electric machine(s) 32 may be supported according to first stiffness(es) (k1) of first support(s) 38 and one or more portion(s) 35 of electric machine(s) 32 distal from forward portion(s) 34 may be supported according to second stiffness(es) (k2) of second support(s) 40. First stiffness(es) (k1) may be greater than second stiffness(es) (k2).

Stiffness(es) (k1) of first support(s) 38 may be sufficient to support a majority of the weight of electric machine(s) 32, maintain substantial alignment of electric machine(s) 32 with low pressure shaft(s) 24 and also damp some vibrations during operation. Stiffness(es) (k2) of second support(s) 40 may be lower so as to accommodate relative axial and/or radial displacement(s) between electric machine(s) 32 and structure(s) 42 and at least partially limit and/or prevent excessive stresses from developing in second support(s) 40, electric machine(s) 32, structure(s) 42 and/or electric machine(s) 32. However, stiffness(es) (k2) of second support(s) 40 may be sufficient to prevent droop of electric machine(s) 32 (i.e. maintain substantial alignment of electric machine(s) 32) and also damp vibrations during operation. Accordingly, second support(s) 40 may be more flexible than first support(s) 38 so that second support(s) 40 may have a lower resistance to relative axial and/or radial displacement between electric machine(s) 32 and structure(s) 42 of engine 10 than first support(s) 38 may have.

The above description is meant to be exemplary only, and one skilled in the art will recognize that changes may be made to the embodiments described without departing from the scope of the invention disclosed. For example, the devices and methods for supporting electric machine(s) 32 described above may also be suitable for supporting other types of shaft-driven accessories in engine 10. The fingers 40 are just one example of a flexible connection that may be used with the present approach, and other suitable connections (e.g. such as tangentially extending struts, squirrel cages-like structures, etc.) may be used in combination or in substitution for those exemplary features described above. Also the devices and methods described above may be used for supporting accessories in any suitable types of engines such as, for example, turboshaft and/or turboprop engines. Still other modifications which fall within the scope of the present invention will be apparent to those skilled in the art, in light of a review of this disclosure, and such modifications are intended to fall within the appended claims.

What is claimed is:

1. A device for supporting an electric machine in a gas turbine engine wherein the electric machine includes an interface for coupling to a shaft of the gas turbine engine, the device comprising:
    a first support configured to secure the electric machine to a structure of the engine, the first support being configured to support a first portion of the machine proximal to the interface and substantially maintain positioning of the interface relative to the shaft; and
    a second support including a plurality of substantially radially extending fingers configured to secure the electric machine to the structure of the engine, the second support being configured to support a second portion of the machine distal from the interface and to provide a lower resistance to relative displacement between the electric machine and the structure of the engine than does the first support.

2. The device as defined in claim 1, wherein the first support and the second support are configured to support the electric machine substantially coaxially with the shaft of the gas turbine engine.

3. The device as defined in claim 1, wherein the second support has a lower resistance to relative axial displacement between the electric machine and the structure of the engine than does the first support.

4. The device as defined in claim 1, wherein the second support comprises an annular member configured for attachment to the structure of the engine, said plurality of substantially radially extending fingers extending from the annular member.

5. The device as defined in claim 4, wherein the fingers are curved in an axial direction of the electric machine.

6. The device as defined in claim 4, wherein the fingers have at least a portion that is substantially C-shaped.

7. The device as defined in claim 1 wherein the second support supports a substantially mid portion of the electric machine.

8. The device as defined in claim 1, wherein the first support comprises a radially outer flange configured for attachment to the structure of the engine and a radially inner flange configured for attachment to the electric machine.

9. The device as defined in claim 8, wherein the first support includes at least a portion which is curved in an axial direction of the electric machine.

10. A gas turbine engine comprising:
    a high pressure spool and a cooperating low pressure spool;
    an accessory mounted in a tail portion of the engine and substantially coaxially with the low pressure spool, the accessory having an interface for coupling with the low pressure spool;
    a first support securing the accessory to a structure of the engine, the first support supporting a first portion of the accessory proximal to the interface and substantially maintaining alignment between the interface and the low pressure spool; and
    a second support securing the accessory to the structure of the engine, the second support supporting a second portion of the accessory distal from the interface, the second support providing a lower resistance to relative displacement between the electric machine and the structure of the engine than does the first support.

11. The gas turbine engine as defined in claim 10, wherein the second support has a lower resistance to relative axial displacement between the accessory and the structure of the engine than does the first support.

12. The gas turbine engine as defined in claim 10, wherein the second support comprises an annular member configured for attachment to the structure of the engine and a plurality of substantially radial fingers extending from the annular member, the fingers being configured for attachment to the accessory.

13. The gas turbine engine as defined in claim 10, wherein the first support comprises a radially outer flange configured for attachment to the structure of the engine and a radially inner flange configured for attachment to the accessory.

14. A method for supporting an electric machine in a tail portion of a gas turbine engine, wherein the electric machine has an interface for coupling to a shaft of a gas turbine engine, the method comprising:
    supporting a first, forward portion of the electric machine proximal to the interface to substantially maintain positioning of the interface relative to the shaft, including supporting a majority of the weight of the electric machine at the first, forward portion of the electric machine;
    supporting a second portion of the electric machine distal from the interface; and
    providing a lower resistance to relative displacement between the second portion of the electric machine and the structure of the engine than between the first portion of the electric machine and the structure of the engine.

15. The method as defined in claim 14, wherein the resistance to relative displacement includes a resistance to axial displacement.

16. The method as defined in claim 15, wherein the electric machine is supported substantially coaxially with a low pressure shaft of the gas turbine engine.

17. The method as defined in claim 14, wherein the second portion of the electrical machine distal from the interface comprises a substantially mid portion of the electric machine.

* * * * *